E. SCHNEIDER.
PRESSURE GAGE FOR HYDROPNEUMATIC RECUPERATORS OF GUNS AND FOR OTHER APPARATUS.
APPLICATION FILED FEB. 14, 1918.

1,316,197.

Patented Sept. 16, 1919.
2 SHEETS—SHEET 1.

Inventor:
Eugène Schneider
By
Mauro, Cameron, Lewis & Massie,
Attorneys.

E. SCHNEIDER.
PRESSURE GAGE FOR HYDROPNEUMATIC RECUPERATORS OF GUNS AND FOR OTHER APPARATUS.
APPLICATION FILED FEB. 14, 1918.

1,316,197.

Patented Sept. 16, 1919.
2 SHEETS—SHEET 2.

Inventor:
Eugène Schneider
By
Mauro, Cameron, Lewis + Massie,
Attorneys.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

PRESSURE-GAGE FOR HYDROPNEUMATIC RECUPERATORS OF GUNS AND FOR OTHER APPARATUS.

1,316,197.  Specification of Letters Patent.  Patented Sept. 16, 1919.

Application filed February 14, 1918. Serial No. 217,191.

*To all whom it may concern:*

Be it known that I, EUGÈNE SCHNEIDER, a citizen of the Republic of France, and a resident of 42 Rue d'Anjou, Paris, France, have invented new and useful Improvements in Pressure-Gages for Hydropneumatic Recuperators of Guns and for other Apparatus, which invention is fully set forth in the following specification.

The graduations of pressure gages for the recuperators of guns and other apparatus are usually so arranged that their indications correspond exactly to the real values of the pressures to be measured at a given normal temperature, such as for instance 15° C. Consequently in order that these indications shall correspond to the said real values at any given moment, they must receive a variable correction according to the temperature of the moment. These corrections are usually supplied to the operator by means of tables, in which he finds opposite a scale of temperature, scales of corresponding pressures.

The pressure gages which are usually employed in combination with guns are intended mostly to show only the deviations of the indications above or below a normal pressure existing in the recuperator. Further, the use of tables indicating corrections for the readings corresponding to variations of temperature is not well adapted for a staff such as that of the gun service, since this use requires the provision of a thermometer that is independent of the pressure gage.

The present invention has now for its object to provide an improved apparatus of simple construction which will give independently upon the actual pressure gage the exact value of the pressure existing in the recuperator corresponding to the temperature of the moment, or in other words, the value of the variable pressure which should be maintained in the recuperator.

According to this invention, a liquid thermometer is fixed on the dial of the pressure gage or on a support that may be movable about the pivot of the indicating hand. This thermometer is arranged in the arc of a circle concentric to the dial of the pressure gage, and its capillary tube has a cross-section such that the level of the liquid will be situated at each moment opposite the graduation of the dial corresponding to the exact value of the pressure existing in the recuperator according to the temperature of the moment. For this purpose the position of the thermometer has of course been previously adjusted in such a manner that for a predetermined temperature, the level of the thermometer will be situated opposite the graduation that indicates the value of the normal pressure to be employed in the recuperator.

Various embodiments of this invention are illustrated, by way of example, in the accompanying drawings:—

Figure 6:
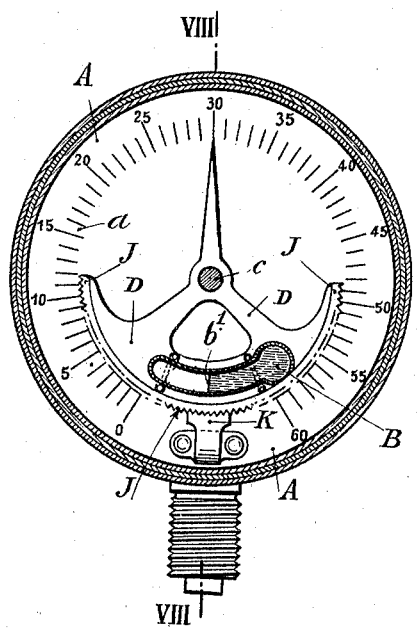
Figs. 6 and 7, are elevations of a modification, wherein the support hereinafter referred to is shown in two different positions.
Figure 7:
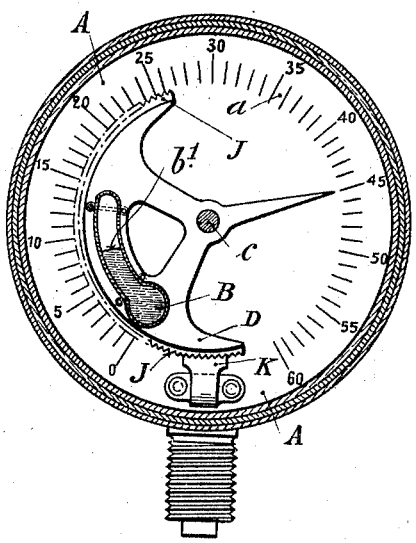

In Figs. 6 and 7, the indicating hand C of the pressure gage is assumed to have been removed; its position is indicated in dot and dash lines in Fig. 6.

Figure 1:
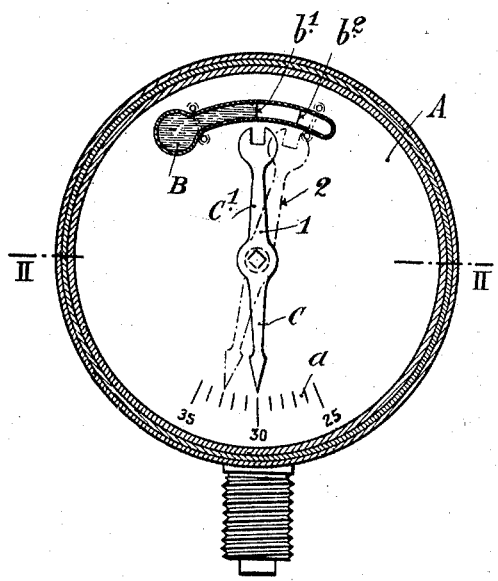
Figure 1 is a sectional front elevation.
Figure 2:
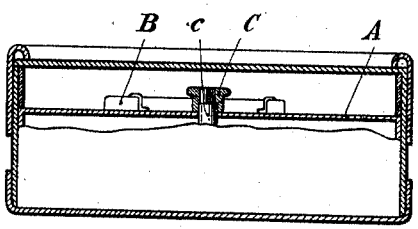
Fig. 2 is a section on the line II—II of Fig. 1, of a first and simple embodiment of the invention.

Referring first to Figs. 1 and 2, A is a dial of a metal pressure gage of known construction, upon which there is fixed according to the invention, a liquid thermometer B. The capillary tube of this thermometer is arranged in an arc of a circle concentric to the graduated scale of pressures $a$. The thermometer is further so constructed and arranged that its level will be situated for a given temperature (for instance 15° C.) opposite the graduation (30°) that corresponds to the normal pressure which it is desired to maintain in the recuperator, or other apparatus, upon which the pressure gage is mounted. The section of the capillary tube of the thermometer is made such that to each position of its indicating level there corresponds a graduation which is located on the same radius or the same diameter of the dial and indicates the exact value of the normal pressure corrected for the temperature of the moment.

The result is that when it is desired to verify at any moment and at any temperature existing at said moment, whether the pressure in the recuperator has the desired normal value, it is sufficient to see that the hand C of the pressure gage, or its prolongation $C^1$, is properly opposite the indicating level of the liquid in the thermometer. If the said hand does not occupy this position, the recuperator must be re-charged with gas until the indicating hand has been moved into the desired position.

If for example, the indicating level of the liquid in the thermometer which was situated at $b^1$ at a temperature of 15°, is situated at $b^2$ at the moment of inspection of the recuperator, the normal pressure which it is necessary to maintain in the latter will then be given by the graduation which is located in the prolongation of this new level, that is to say, in the example, the graduation 33. In order that the pressure in the recuperator shall have the desired value, it is therefore sufficient if the hand C occupies the position 2, that is to say, if the prolongation of the hand coincides with the level $b^2$.

This prolongation $C^1$ of the hand may terminate in a fork, the prongs of which comprise between them the level $b^2$ of the moment; the space between these prongs corresponds to the permitted tolerance.

Figure 3:
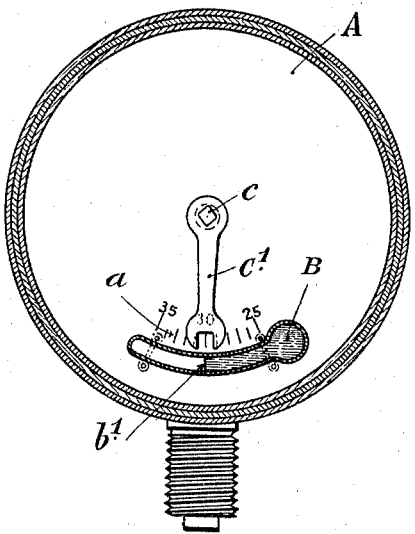
Fig. 3 is a sectional front elevation of a modification.

The thermometer B instead of being located along a sector diametrically opposite the graduated sector $a$, may be located as shown in Fig. 3, in which case the value of the normal pressure corrected according to the temperature, will be read directly opposite the indicating level of the liquid in the thermometer.

It is to be noted, as a matter of fact, that it is not necessary to read the graduations, that is to say, the graduation of the exact pressure of the moment, but that the only verification which the operator has to make consists in seeing whether the hand C, or its prolongation $C^1$, is correctly opposite the indicating level of the liquid in the thermometer.

Figure 4:
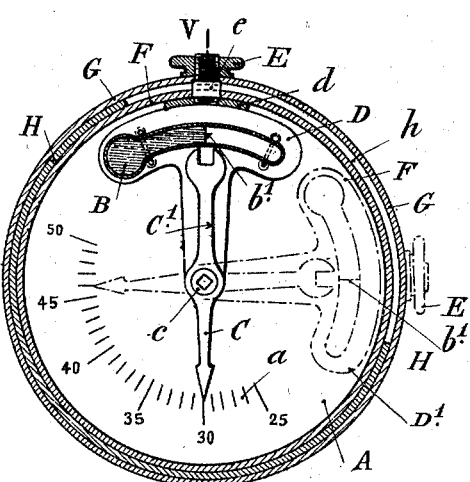
Fig. 4 is a section on the line IV—IV of Fig. 5.
Figure 5:
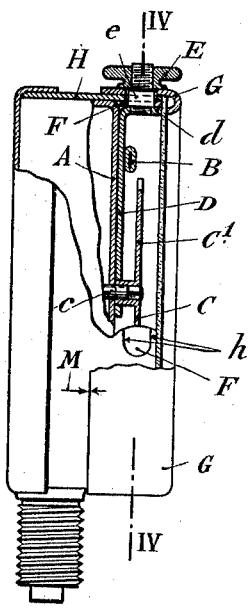
Fig. 5 is a cross-section on the line V—V of Fig. 4, of a pressure gage constructed according to this invention designed to be used at will on recuperators of guns, at different normal pressures.
Figure 8:
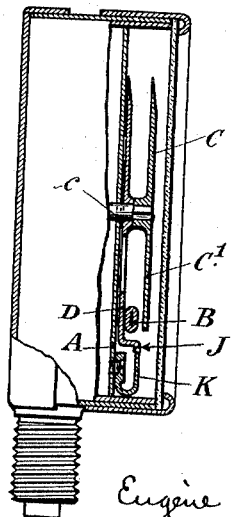
Fig. 8 is a cross-section on the line VIII—VIII of Fig. 6.

Figs. 4 and 5 show a pressure gage adapted to be used at will on recuperators for guns charged at different normal pressures.

In this embodiment, the thermometer B is mounted on a support D, movable on the pivot $c$ of the hand C, (Fig. 5). This support can be shifted by means of a knurled nut E, the stem $e$ of which is fixed to a lug $d$ on the support D, and extends through the two rings F and G that are movable on the casing H of the pressure gage. $h$ is a groove formed in the said casing H.

When the pressure gage is to be employed with a gun for which the normal pressure in the recuperator is for instance 30 kgs. at the normal temperature of 15°, the support D is fixed in the position shown in full lines in Figs. 4 and 5. This fixing is effected by simply clamping the nut E against the outer surface of the ring G. If it is desired to employ the pressure gage in combination with the recuperator of another gun, for which the normal pressure is for instance 46 kgs., then it is sufficient to slack the nut E and to shift its stem in the groove $h$ in such a manner as to bring the support D into the position $D^1$ indicated in dot and dash lines in Fig. 4.

In that position the level $b^1$ at the normal temperature of 15° C. is situated in the prolongation of the graduation 46. This position may be indicated by a register mark M (Fig. 5) placed on the casing H of the pressure gage. It is to be understood that the casing H may be so marked with register marks corresponding to the positions which the thermometer B is to occupy when the apparatus is used with a series of different guns.

The means for fixing the support D in a position varying with the normal pressure to be checked, may receive widely different practical embodiments. In Figs. 6 and 7, the support D is shown in two different positions.

In this embodiment, the support D is provided with a toothed sector J whose teeth are normally engaged with those of a flexible lug K fixed on the dial A. In erecting the apparatus the support D is arranged relatively to the fixing lug K in the desired position wherein the level $b^1$ of the liquid in the thermometer is located in the prolongation of the graduation corresponding to the normal pressure of the apparatus on which the pressure gage is to be mounted.

The position of the support D can be readily changed by pressing the flexible lug K in such a manner as to disengage the teeth of the support D, whereupon the latter can be shifted into another position by rotating it on the pivot $c$ of the hand.

The support D can now be fixed or locked in its newly adjusted position by simply removing the pressure upon the lug K.

It is to be noted that theoretically, if it were desired that the thermometer should occupy for the various values of the normal pressure, that is to say, for the series of different recuperators, a position such that the corrections would be strictly exact in all cases, it would be necessary to shift the thermometer according to a determined law, suitably changing its distance from the pivot of the hand. An approximate solution would consist in causing the thermometer to turn about an axis that is suitably eccentric relatively to the said pivot. In most cases, however, the means hereinbefore described and shown in the drawings will give practically sufficient approximately correct values.

What I claim is:—

1. In a pressure gage for hydro-pneumatic recuperators for guns or other apparatus, the combination of a gage dial indicating pressure in said recuperator, a liquid thermometer having its capillary tube struck on a curve having its center coincident with the scale of graduations on the dial and so positioned in respect to said graduations that the temperature-indicating level of the thermometer liquid moves into line with the scale graduations indicating directly the pressures required in the recuperator to maintain a predetermined charge therein.

2. A pressure gage as claimed in claim 1 wherein said thermometer is provided with a revoluble support having its axis coincident with the center of said graduations, and means for locking said support.

In testimony whereof I have signed this specification.

EUGÈNE SCHNEIDER.

Witnesses:
 ANDRÉ MOSTICKER,
 CHAS. P. PRESSLY.